United States Patent [19]

Warf

[11] 4,366,878
[45] Jan. 4, 1983

[54] MOISTURE-REMOVING LOW-RESTRICTION AIR INTAKE SYSTEM

[75] Inventor: William R. Warf, Willits, Calif.
[73] Assignee: Paccar Inc., Bellevue, Wash.
[21] Appl. No.: 217,239
[22] Filed: Dec. 17, 1980
[51] Int. Cl.³ .................................................. B60K 1/00
[52] U.S. Cl. ................................ 180/54 A; 55/385 B
[58] Field of Search .................... 180/54 A; 137/204; 55/385 B

[56] References Cited

U.S. PATENT DOCUMENTS

| | | | |
|---|---|---|---|
| 3,740,932 | 6/1973 | Borsheim | 55/394 |
| 3,791,112 | 2/1974 | Lidstone | 180/54 A |
| 3,847,577 | 11/1974 | Hansen | 55/385 |
| 3,864,109 | 2/1975 | Hansen | 55/324 |
| 3,934,992 | 1/1976 | Thompson | 55/324 |
| 3,972,700 | 8/1976 | Gleockler et al. | 55/385 B |
| 3,987,862 | 10/1976 | Lidstone | 180/54 A |
| 4,014,673 | 3/1977 | Kinnison | 55/396 |
| 4,157,902 | 6/1979 | Tokar | 55/385 B |
| 4,159,899 | 7/1979 | Deschenes | 55/454 |
| 4,173,458 | 11/1979 | Stiles | 55/405 |
| 4,198,217 | 4/1980 | Erdmannsdorfer | 55/385 F |
| 4,212,659 | 7/1980 | Magrini | 55/385 B |

FOREIGN PATENT DOCUMENTS

| | | |
|---|---|---|
| 129633 | 10/1948 | Australia . |
| 412865 | 2/1946 | Italy . |
| 539188 | 9/1941 | United Kingdom . |

*Primary Examiner*—Joseph F. Peters, Jr.
*Assistant Examiner*—John A. Carroll
*Attorney, Agent, or Firm*—Owen, Wickersham & Erickson

[57] ABSTRACT

An air intake system for a motor vehicle having a cab and an internal combustion engine with an air cleaner, comprising a substantially vertical snorkel pipe free from internal obstructions and having an obstruction-free forced air cap at its upper end. A footpipe is connected directly to the lowest end of the snorkel pipe. The footpipe has a sharp right angle bend directly below the snorkel pipe, an elevated horizontal outlet leading to the air cleaner, and air-impeding water drain means at the lowest point of the bend, which forms a water trap, for removing moisture which enters the air intake system.

5 Claims, 6 Drawing Figures

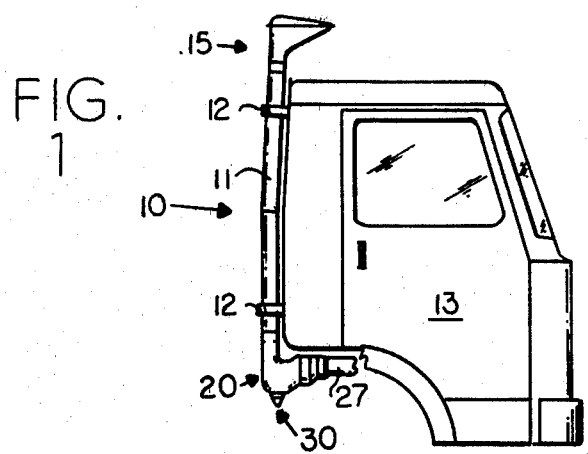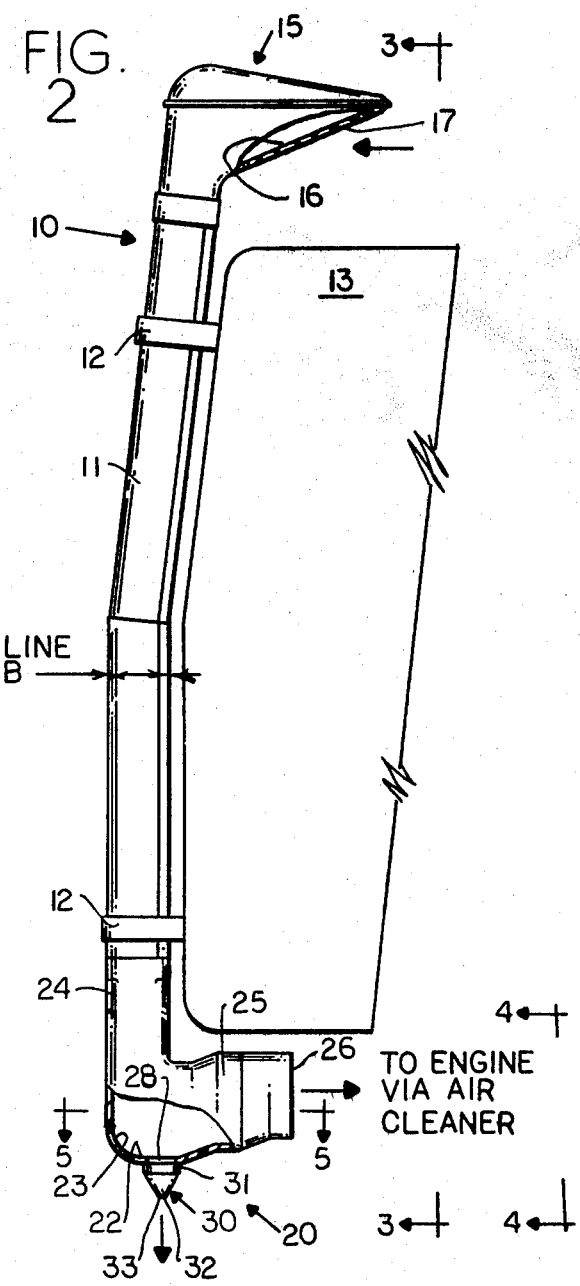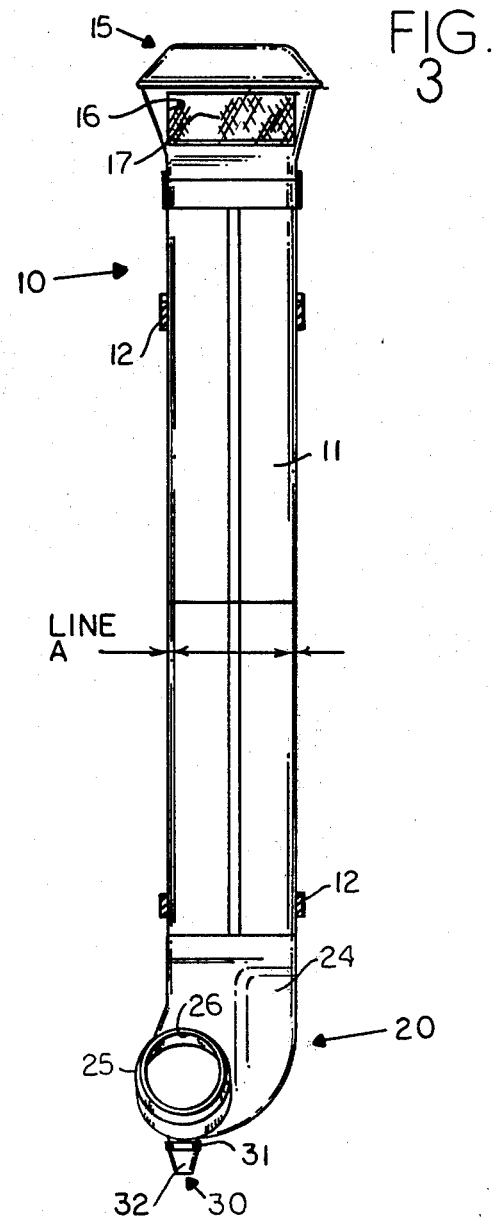

U.S. Patent   Jan. 4, 1983   Sheet 2 of 2   4,366,878
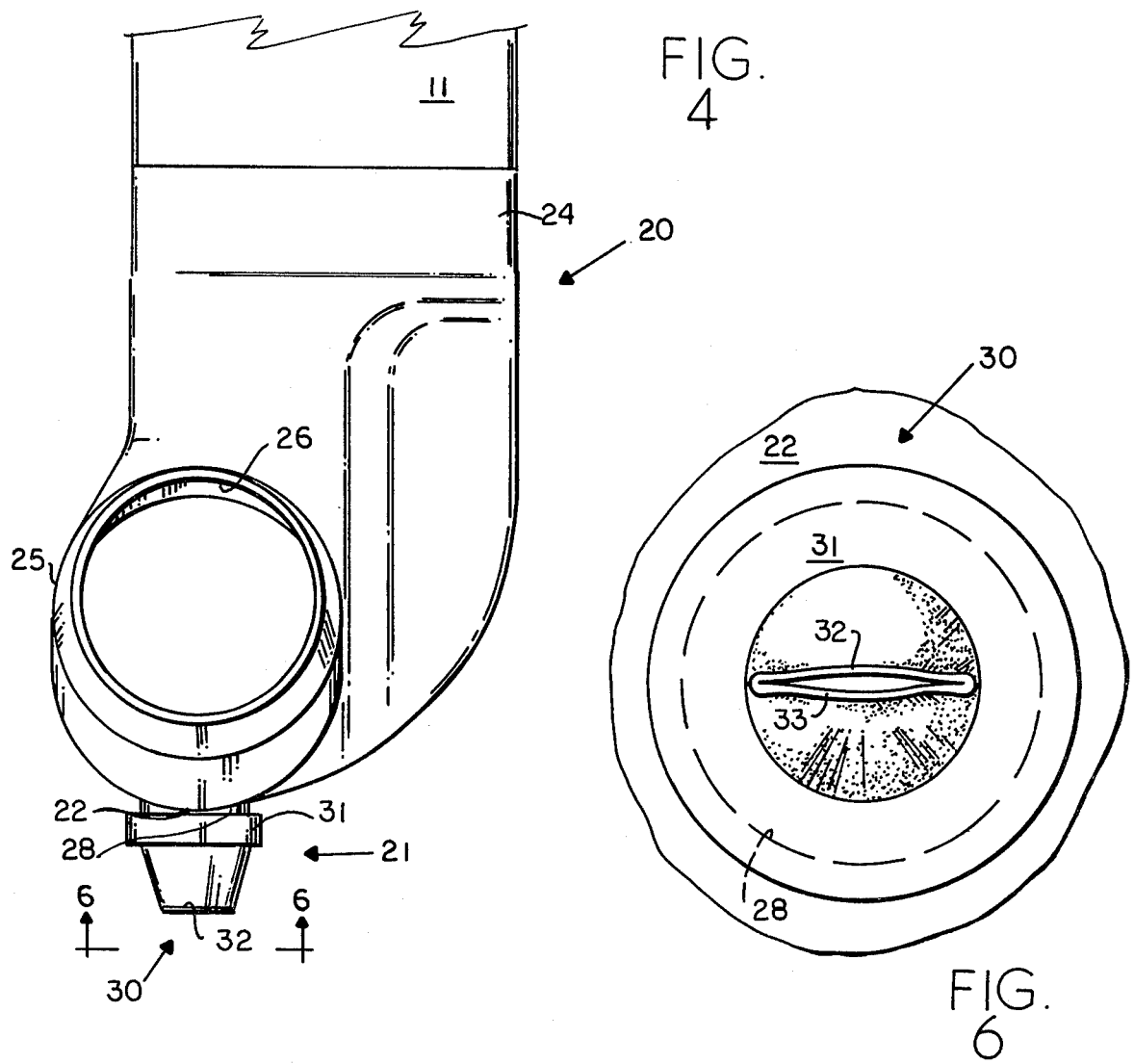

MOISTURE-REMOVING LOW-RESTRICTION AIR INTAKE SYSTEM

BACKGROUND OF THE INVENTION

This invention relates to an air intake for a large internal combustion engine on a large truck. The engine may either be a diesel or a gasoline engine.

To protect such expensive engines from damage by ingestion of road dust, the air inlet system conventionally includes an air cleaner. Ambient air is supplied to the air cleaner through an inlet or snorkel pipe, usually in the form of a large riser extending vertically upwardly behind the truck cab.

The elimination of moisture from such air intake systems has typically been provided for by a moisture-eliminating cap or hood at the top of the snorkel pipe, or by filters or other restrictions in the pipe itself. In addition to preventing the direct falling of precipitation into the vertical pipe, the caps have also been provided with internal devices that collect and eject moisture which enters the cap due to the forward motion of the vehicle. Examples of such intake caps are disclosed in U.S. Pat. Nos. 3,987,862 and 3,791,112 where cross sectional narrowings, configuration changes, and tangentially directed vanes have been used for centrifugal separation of the moisture from the air; thereafter the collected water passes out through a drain opening in the cap. These moisture removal systems, however, all restrict the flow of air through the system, and in large engines all such restrictions unduly limit the supply of air to the engine.

In order to get the maximum amount of air to flow to the intake, ram air systems have been designed to scoop the air from the direction of travel and feed it to the engine, thereby taking advantage of additional air pressure. Reducing the water intake by rotating the cap so that the air intake faces the direction opposite the vehicle's movement is undesirable because it interferes with the ram air effect, resulting in reduction of air intake when the truck is moving at high speed.

Attempts to eliminate moisture at or near the air cleaner have heretofore been unsatisfactory also. Some such systems provided for a discharging check valve at the bottom of the air cleaner, but disclosed a check valve which opened to permit drainage only when the engine was shut off, the valve being held closed by the negative pressure of the air intake during engine operation. This system made possible the accumulation of large amounts of water inside the air cleaner during rainstorms. Moreover, it is preferred to remove the water upstream from the air cleaner in order to prevent rusting it or wetting the filter element and thereby hampering its cleaning action.

Thus, heretofore the elimination of moisture from the air inlet systems of large trucks and the like has remained a problem. It has been difficult to take advantage of the ram air characteristics of a forward facing air cap, without restricting the forced air flow.

It is therefore, an object of the invention to provide an air intake system which separates moisture from the air without interfering with the maximum flow of air to the truck's internal combustion engine.

Another object of the invention is to provide a low-restriction air intake system which has a large air flow capacity, yet which occupies a minimum of space between the back of the tractor cab and the trailor in large trucks and the like.

Yet another object of the invention is to provide a low-restriction air intake system which substantially eliminates moisture from the air before it passes to the air cleaner.

SUMMARY OF THE INVENTION

The present invention employs a rectangular, obstruction-free, forward-facing forced air intake cap having no water ejector, disposed above the cab of a large truck or tractor. The cap is connected to a substantially vertical snorkel pipe behind the cab, extending from the top to the bottom of the cab. In a preferred embodiment the snorkel pipe is rectangular, to conserve payload space, being wider laterally than longitudinally. The vertical snorkel pipe is connected, at its bottom, to a footpipe which turns a right angle, its horizontal outlet being connected to a horizontal pipe that goes to the air cleaner. The footpipe is provided with a recessed water trap or sump having drain means at its lowest point.

Other features and advantages of the present invention will be apparent to persons skilled in the art from the following description accompanied by the attached drawings.

BRIEF DESCRIPTION OF THE DRAWINGS

FIG. 1 is a fragmentary side elevational view of a truck showing a cab and a moisture-removing, low-restriction air intake system embodying the principles of the invention mounted behind the cab.

FIG. 2 is an enlarged fragmentary side elevational view of the moisture-removing, low-restriction air intake system of the invention, partially broken away at the right-angle bend in the footpipe to illustrate the moisture removing portion.

FIG. 3 is a front end view of the moisture-removing, low-restriction air intake system of the present invention, taken along line 3—3 in FIG. 2.

FIG. 4 is an enlarged front view of the moisture-removing, low-restriction air intake system of the invention, taken along line 4—4 in FIG. 2.

FIG. 5 is an enlarged top view of the moisture-removing footpipe of the present invention, taken along line 5—5 in FIG. 2.

FIG. 6 is an enlarged bottom view of the vacuator valve of the invention, taken along line 6—6 in FIG. 4, illustrating the valve lips in an open position.

DESCRIPTION OF A PREFERRED EMBODIMENT

FIG. 1 shows a moisture-removing, low-restriction air intake system 10 embodying the principles of the invention. The system 10 includes an obstruction-free, substantially vertical snorkel pipe or riser 11 mounted by suitable brackets 12 to the rear of a truck cab 13. As better illustrated in FIG. 2, the snorkel pipe 11 is surmounted by a forward-facing, forced air cap 15. In the present invention this cap 15 is free from internal restrictions and has no mechanism for removing moisture.

As illustrated in FIG. 3 the forward-facing, forced air cap 15 has an opening 16 through which air is admitted to the intake system 10. The opening 16 is protected on top from the direct entry of falling rain and snow, and in front from the entry of solid debris by a screen 17, and is oriented to scoop oncoming air when the vehicle is in motion, which air is then fed to the engine, taking advantage of the resulting increased air pressure. The opening 16 is high enough above the cab to avoid collecting water reflected from the cab roof, and its angled shape prevents snow packing. Increased air flow and savings of space are achieved by making the snorkel pipe 11 rectangular, being broader laterally, as indicated by line a in FIG. 3, than longitudinally, indicated by line b in FIG. 2. For example one such pipe is 280 mm wide by 130 mm front to rear.

Referring to FIG. 2, the snorkel pipe 11 is connected at its lower end to a footpipe 20 having drain means 21 (FIG. 4) at its lowest point in a water trap 22 that lies just beyond a very sharp right angle bend 23. The footpipe 20 thus has a vertical portion 24, which in a preferred embodiment is rectangular, and a horizontal portion 25 with a round outlet 26. The horizontal portion 25 rises above the water trap 22 so that the lowest point of the round outlet 26 is higher than the drain means 21. The outlet 26 is connected to the engine's air cleaner by a suitable conventional pipe 27 (FIG. 4). The round outlet 26 is offset away from the truck cab 13 to meet the connecting pipe 27, as illustrated in FIG. 4. The footpipe 20 is preferably made of molded plastic and has a drain opening 28 providing part of the drain means 21.

FIGS. 2, 3, 4, and 5 show the drain means 21 also includes a vacuator 30 comprising a molded elastomeric member which is relatively soft and flexible. Its upper end 31 is attached to the drain opening 27, and below that are a pair of reed-like lips 32 and 33 that normally are closed but which part readily under the weight of water, as illustrated in FIG. 6.

The centrifugal force provided by the right angle turn 23 of the footpipe 20 is supplemental by the substantial freefall through the quite long substantially vertical pipe 11 to separate moisture from the air and collect it in the water trap 22, whence it is automatically removed by the drain means 21.

Preferred materials for the air intake system 10 are stainless steel or aluminium, although certain plastics may also be employed.

A test has been conducted, in which an air cleaner was placed at an outlet 26 of the footpipe 20, and air was drawn through the air cleaner, thus simulating engine vacuum. The cap 15 was placed in a wind tunnel where water spray and air were blown at it, simulating driving in heavy rain at 55 mph. This test showed that the footpipe 20 of the invention was able to eliminate virtually all of the water from the intake snorkel 11, leaving only two or three tablespoons of water in a catch jar at the bottom of the air cleaner after twenty minutes of operation. Similar tests conducted on the prior art forced air caps with water ejectors on an air intake system without the footpipe of the present invention showed no advantage in water elimination, but also showed increased air flow restriction.

The preferred embodiment described herein is intended to be purely illustrative, and not limiting of the scope of the invention. Other embodiments and variations will be apparent to those skilled in the art and may be made without departing from the essence and scope of the invention as defined in the following claims.

I claim:

1. A moisture-removing, low-restriction, engine-air intake for a truck having a cab and an internal combustion engine with an air cleaner supplying cleaned air to the engine, comprising:

an obstruction-free, substantially vertical pipe portion behind the cab, said vertical pipe portion having an inlet end positioned generally above the upper end of the cab and an interior passage free from internal structures and obstructions extending down to a footpipe portion defining a substantially right angle passageway leading from the vertical pipe portion to a horizontal outlet below said cab and connected to said air cleaner, said footpipe portion having a sunken water-trap on its bottom where said right angle becomes horizontal, said water-trap being vertically in line with the lower portion of said vertical pipe portion and a bottom wall leading upwardly therefrom to said outlet, the abrupt change in direction of flow of the air at said right angle tending to separate entrained water from the air and deposit it in said water-trap, an obstruction-free forced-air cap on said inlet end, and drain means in said water-trap for evacuating collected water from said air-trap without leaking any substantial amount of air therefrom.

2. The low restriction air intake system of claim 1 wherein said vertical pipe is rectangular in horizontal cross-section and much wider laterally than it is longitudinally, so that it can carry more air in a short space behind said cab, and wherein said footpipe portion changes in shape from rectangular where it meets said vertical pipe portion to a round outlet.

3. An air intake conduit for a motor vehicle having a cab with a substantially vertical rear wall and an internal combustion engine with an air cleaner from which air enters the engine, comprising:

a substantially vertical pipe portion free from internal obstructions and having an obstruction-free forced air cap at its upper end, located just to the rear of said cab and extending above and below said cab, a footpipe portion connected directly to the lowest end of said vertical pipe portion and having a sharp right angle bend directly below the vertical pipe portion and an elevated horizontal outlet leading to the air cleaner, and air-impeding, water drain means at the lowest point of said bend for removing moisture which enters said air intake conduit and is separated from the air at said bend by virtue of the sharp change of direction.

4. A moisture-removing, engine- air intake for a truck powered by an internal combustion engine and having a cab, comprising:

conduit means behind said cab having a long internally unobstructed vertical passage with an unobstructed air intake cap at its upper end and a sharply curved right angle at the lower end of said passage leading horizontally to said engine, whereby moisture is removed from the incoming air at said right angle, water trapping means just below and at the end of said right angle for collecting the removed moisture, and drain means for draining water from said trapping means without passing any substantial amount of air therethrough.

5. The air intake of claim 4 wherein said drain means comprises a flexible elastomeric member connected to an opening in said water-trapping means and having a pair of reed-like lips depending therefrom, said lips being opened by the weight of collected water.

* * * * *